(12) United States Patent
Ryu

(10) Patent No.: US 10,719,720 B2
(45) Date of Patent: Jul. 21, 2020

(54) ARTIFICIAL INTELLIGENCE SYSTEM FOR PROVIDING ROAD SURFACE RISK INFORMATION AND METHOD THEREOF

(71) Applicant: KOREA INSTITUTE OF CIVIL ENGINEERING AND BUILDING TECHNOLOGY, Goyang-si (KR)

(72) Inventor: Seung Ki Ryu, Goyang-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 111 days.

(21) Appl. No.: 16/179,021

(22) Filed: Nov. 2, 2018

(65) Prior Publication Data
US 2019/0188501 A1 Jun. 20, 2019

Related U.S. Application Data

(63) Continuation of application No. PCT/KR2018/009043, filed on Aug. 8, 2018.

(30) Foreign Application Priority Data

Dec. 18, 2017 (KR) ........................ 10-2017-0174052

(51) Int. Cl.
G06K 9/00 (2006.01)
G06K 9/62 (2006.01)

(52) U.S. Cl.
CPC ....... G06K 9/00805 (2013.01); G06K 9/6262 (2013.01); G06K 9/6267 (2013.01)

(58) Field of Classification Search
CPC ........... G06K 9/00791; G06K 9/00805; G06K 9/6262; G06T 2207/20081; G06T 2207/30252; G06T 2207/30261; B60W 40/06; B60W 2552/35
See application file for complete search history.

(56) References Cited

U.S. PATENT DOCUMENTS

2019/0220011 A1* 7/2019 Della Penna ........ G08G 1/0133
2019/0344783 A1* 11/2019 Bertollini et al. ..........................
B60W 50/0098

FOREIGN PATENT DOCUMENTS

| JP | 2010163131 A | 7/2010 |
|---|---|---|
| KR | 10-1453654 B1 | 10/2014 |
| KR | 101501851 B1 | 3/2015 |
| KR | 10-179818 B1 | 8/2017 |
| KR | 101778724 B1 | 9/2017 |

OTHER PUBLICATIONS

International Search Report—PCT/KR2018/009043 dated Jan. 22, 2019.

* cited by examiner

*Primary Examiner* — Andrew W Johns
(74) *Attorney, Agent, or Firm* — Cantor Colburn LLP

(57) ABSTRACT

Provided is an artificial intelligence system for providing road risk information and a method thereof. The system for providing road risk information includes: an information collection unit for receiving various road state information acquired from a vehicle device; an information processing unit for performing image processing on the collected road state information, and converting a result of the image processing into a predefined grayscale image; an information learning unit for learning the converted predefined grayscale image on the basis of a predetermined learning model based on deep learning, and recognizing the road risk information on the basis of a result of the learning; and an information classification unit for classifying the road risk information from the road state information on the basis of a result of the recognition, and detecting road surface defects on the basis of a result of the classification.

10 Claims, 5 Drawing Sheets

ARTIFICIAL INTELLIGENCE SYSTEM FOR PROVIDING ROAD SURFACE RISK INFORMATION AND METHOD THEREOF

TECHNICAL FIELD

The present invention relates to a road risk information classification system, and more specifically, to a system and method for classifying road risk information on the basis of deep learning.

BACKGROUND ART

Generally, a road that is prepared for driving of vehicles is constructed using a material such as asphalt, concrete or the like, and various types of road surface markings for guiding driving of vehicle drivers, as well as lines for dividing driving paths, are formed on the road surface. At this point, the road surface markings include turn-left, turn-right and go-straight arrows, markings of destination names, speed limit markings, crosswalk markings and the like.

Although vehicle drivers reach a destination with the help of the road surface markings and road signs like this in the past, recent vehicle drivers drive with the guidance of a navigation device installed in a vehicle to further quickly and conveniently reach the destination. A general navigator provided with a display implements various functions, such as guiding routes to a destination, alarming speed limits, displaying rest areas and gas stations and the like, for comfortable driving of a vehicle driver.

However, since the navigator is merely an apparatus which recognizes a road as a simply line and guides a route on the basis of a map, it may not provide intuitive guidance on a state of a road. For example, when traffic lanes or road surface markings are erased and difficult to identify or roads are damaged to have cracks or potholes, if the drivers rely only on the navigator, the risk of occurring an accident may greatly increase due to the bad condition of the roads. Accordingly, a system that can also provide practical guidance on the road states, in addition to simple guidance on the routes using the navigator, is required to solve the problem.

DISCLOSURE OF INVENTION

Technical Problem

Therefore, the present invention has been made in view of the above problems, and it is an object of the present invention to provide a system and method for classifying road risk information on the basis of deep learning, which collects road state information photographing a driving road, learns the collected road state information on the basis of a learning model based on deep learning, and classifies road risk information on the basis of a result of the learning.

However, the object of the present invention is not limited to the object described above and may be diversely expanded without departing from the spirit and scope of the present invention.

Technical Solution

To accomplish the above object, according to one aspect of the present invention, there is provided a system for classifying road risk information, the system comprising: an information collection unit for receiving various road state information acquired from a vehicle device; an information processing unit for performing image processing on the collected road state information, and converting a result of the image processing into a predefined grayscale image; an information learning unit for learning the converted predefined grayscale image on the basis of a predetermined learning model based on deep learning, and recognizing the road risk information on the basis of a result of the learning; and an information classification unit for classifying the road risk information from the road state information on the basis of a result of the recognition, and detecting road surface defects on the basis of a result of the classification.

In addition, the information processing unit may extract a polygonal Region of Interest (ROI) from a road image among the collected road state information, perform image processing on the extracted ROI, and create a predefined grayscale image on the basis of a result of the image processing.

In addition, the information learning unit may learn the converted predefined grayscale image on the basis of at least two predetermined learning models based on deep learning.

In addition, the system for classifying road risk information may further comprise an information transmission unit for transmitting the road surface defects detected by the information classification unit to the user device.

According to another aspect of the present invention, there is provided a system for classifying road risk information, the system comprising: a communication unit for collecting various road state information acquired from a vehicle device; a control unit for learning the collected road state information on the basis of a predetermined learning model based on deep learning, classifying the road risk information from the road state information on the basis of a result of the learning, and detecting road surface defects on the basis of a result of the classification; and a storage unit for storing the collected road state information, the predetermined learning model, and the classified road risk information.

In addition, the control unit may activate a mobile application, perform image processing on the collected road state information through the activated mobile application, convert a result of the image processing into a predefined grayscale image, and learn the converted predefined grayscale image on the basis of a predetermined learning model based on deep learning.

In addition, the control unit may extract a Region of Interest from a road image among the collected road state information, perform image processing on the extracted ROI, and create a predefined grayscale image on the basis of a result of the image processing.

In addition, the control unit may recognize the road risk information on the basis of a result of the learning, classify the road risk information from the road state information on the basis of a result of the recognition, and detect road surface defects on the basis of a result of the classification.

According to still another aspect of the present invention, there is provided a method of classifying road risk information, the method comprising: an information collection step of receiving various road state information acquired from a vehicle device; an information processing step of performing image processing on the collected road state information, and converting a result of the image processing into a predefined grayscale image; an information learning step of learning the converted predefined grayscale image on the basis of a predetermined learning model based on deep learning, and recognizing the road risk information on the basis of a result of the learning; and an information classification step of classifying the road risk information from the road state information on the basis of a result of the recognition, and detecting road surface defects on the basis of a result of the classification.

In addition, the information processing step may extract a Region of Interest (ROI) from a road image among the collected road state information, perform image processing on the extracted ROI, and create a predefined grayscale image on the basis of a result of the image processing.

Advantageous Effects

The present invention may detect road surface defects by collecting road state information photographing a driving road, learning the collected road state information on the basis of a learning model based on deep learning, and classifying road risk information on the basis of a result of the learning.

In addition, since the present invention is able to extract road surface defects using artificial intelligence based on deep learning, traffic accidents can be prevented.

In addition, since the present invention learns the road state information on the basis of artificial intelligence based on deep learning and classifies road risk information on the basis of a result of the learning, reliability of information can be enhanced.

However, the effects of the present invention are not limited to the effects as described above, but may be diversely expanded without departing from the spirit and scope of the present invention.

DESCRIPTION OF SYMBOLS

Figure 1:
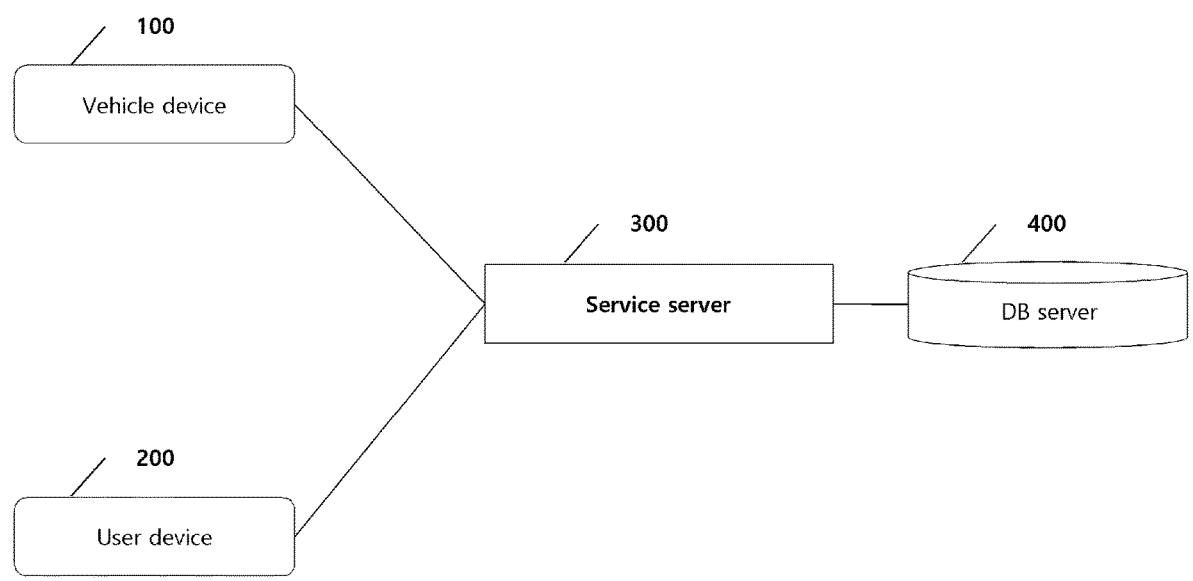
FIG. 1 is a view showing a system for classifying road risk information according to an embodiment of the present invention.

100: Vehicle device
200: User device
300: Service server
400: Database

BEST MODE FOR CARRYING OUT THE INVENTION

The detailed description of the present invention will be described below with reference to the accompanying drawings showing specific embodiments in which the present invention can be embodied. These embodiments will be described in detail as sufficient as to be embody the present invention by those skilled in the art. It should be understood that the diverse embodiments of the present invention do not need to be mutually exclusive although they are different from each other. For example, the specific shapes, structures and characteristics disclosed herein may be implemented in other embodiments in relation to an embodiment without departing from the spirit and scope of the present invention. In addition, it should be understood that the positions or arrangements of individual components in each disclosed embodiment can be changed without departing from the spirit and scope of the present invention. Accordingly, the detailed description described below is not intended to be taken as a restrictive meaning, but if it is properly described, the scope of the present invention is restricted only by the appended claims, together with all scopes equivalent to the claims. In the drawings, the similar reference symbols refer to the same or similar functions throughout several aspects.

Hereinafter, a system and method for classifying road risk information on the basis of deep learning according to an example embodiment of the present invention will be described with reference to the accompanying drawings. Particularly, the present invention proposes a new method of detecting road surface defects on the basis of road risk information by collecting road state information photographing a driving road, learning the collected road state information on the basis of a learning model based on deep learning, and classifying the road risk information on the basis of a result of the learning.

FIG. 1 is a view showing a system for classifying road risk information according to an embodiment of the present invention.

Referring to FIG. 1, a system for classifying road risk information according to an embodiment of the present invention may include a vehicle device 100, a user device 200, a service server 300 and a database 400.

The vehicle device 100 is attached to a vehicle and may acquire various road state information, such as road images, sensing values and the like, from a road on which the vehicle is running. The vehicle device 100 may include a camera for acquiring the road images, and a sensor for acquiring the sensing values. The vehicle device 100 may connect to the user device 200 through wireless communication and provide the user device 200 with various types of acquired information.

The user device 200 may connect to the vehicle device 100 through wireless communication, collect various road state information, and transfer the collected various road state information to the service server 300.

The service server 300 may connect to the user device 200 through wireless communication, receive various road state information, learn the received road state information on the basis of deep learning, classify the road risk information on the basis of a result of the learning, and detect road surface defects on the basis of the classified road risk information. The road risk information may include, for example, potholes, fallen objects, cracks, black ice, damage of lanes and the like. Here, the pothole is a local small hole formed on the pavement surface when the asphalt pavement is commonly used.

In addition, the deep learning algorithm refers to a technique used to allow a computer to make a decision and learn like a human being and to cluster or classify objects or data through the computer. For example, the deep learning algorithm includes Deep Neural Network (DNN), Convolutional Neural Network (CNN), Recurrent Neural Network (RNN), Restricted Boltzmann Machine (RBM) and the like.

The database 400 may store and manage the collected road state information, at least one predefined learning model, and the road risk information classified through the learning model.

Figure 2:
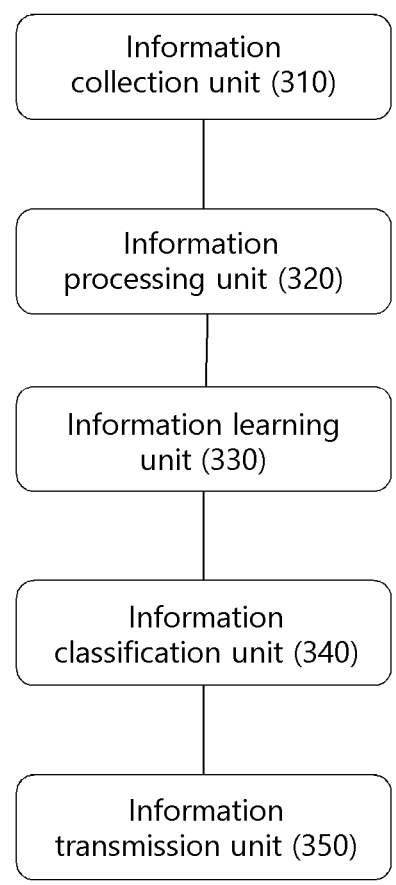
FIG. 2 is a view showing the configuration of the service server shown in FIG. 1.

FIG. 2 is a view showing the configuration of the service server shown in FIG. 1.

Referring to FIG. 2, the service server 300 according to an embodiment of the present invention may include an information collection unit 310, an information processing unit 320, an information learning unit 330, an information classification unit 340 and an information transmission unit 350.

The information collection unit 310 may connect to the user device through wireless communication and collect various road state information. The object of the information collection unit is collecting road state information, and the information collection unit collects unclassified abnormal road state information.

The information processing unit 320 may extract a Region of Interest (ROI) from a road image among the collected road state information, perform image processing on the extracted ROI, and create a predefined grayscale image on the basis of a result of the image processing. Although all the road images may be used in the present invention, only the ROI may be converted and used as a predefined grayscale image for effective utilization of system resources. In addition, the ROI is set in a variety of forms. The ROI is set in a polygonal form, such as a rectangular or trapezoidal form, by adjusting the outer line of the ROI in a direction parallel to the lanes by utilizing a sense of perspective.

The information learning unit 330 may learn the converted predefined grayscale image on the basis of a learning model based on deep learning, and recognize road risk information on the basis of a result of the learning. A learning device compares the grayscale image with a reference image manufactured in advance.

The information classification unit 340 may classify the road risk information, for example, potholes and non-potholes, from the road state information on the basis of a result of the recognition, and detect road surface defects. In addition, the information classification unit 340 classifies the non-potholes in detail according to road damage types, such as labeling, turtle crack, lateral or traversal damage, spalling and the like, and also classifies features other than those of the road pavement surface, such as objects fallen on the road, skid marks, manholes and the like.

The information transmission unit 350 may transmit the detected road surface defects to the user device.

Figure 3:
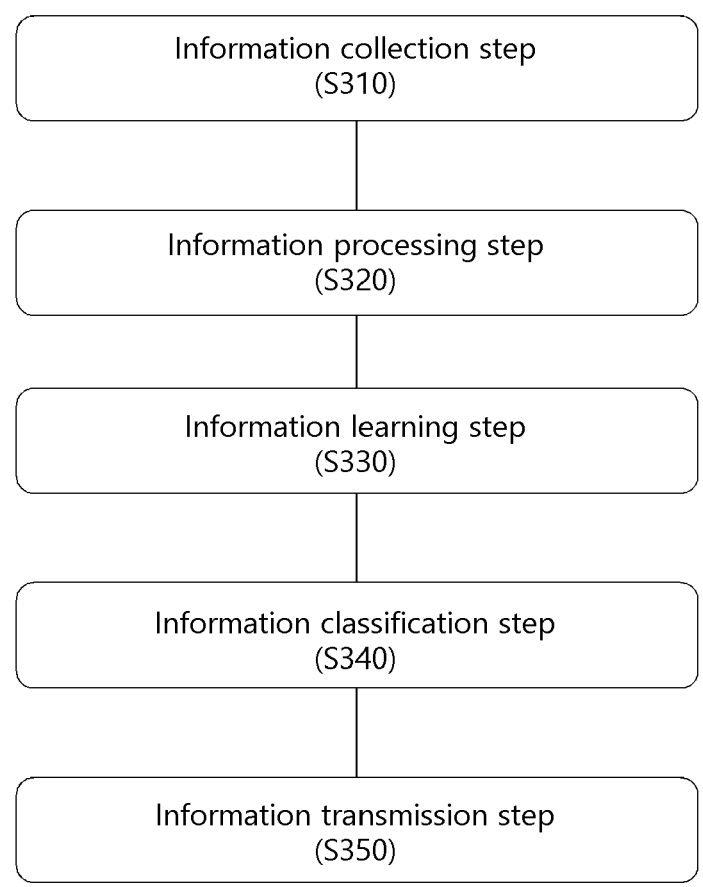
FIG. 3 is a flowchart illustrating a method of classifying road risk information according to an embodiment of the present invention.

FIG. 3 is a flowchart illustrating a method of classifying road risk information according to an embodiment of the present invention.

Referring to FIG. 3, a method of classifying road risk information according to an embodiment of the present invention may include an information collection step S310, an information processing step S320, an information learning step S330, an information classification step S340, and an information transmission step S350.

The information collection step S310 may be provided with various road state information acquired from the vehicle device.

The information processing step S320 may perform image processing on the collected road state information and convert a result of the image processing into a predefined grayscale image.

The information learning step S330 may learn the converted predefined grayscale image on the basis of a predetermined learning model based on deep learning, and recognize road risk information on the basis of a result of the learning.

The information classification step S340 may classify the road risk information from the road state information on the basis of a result of the recognition, and detect road surface defects on the basis of a result of the classification.

The information transmission step S350 may transmit the detected road surface defects to the user device.

Figure 4:
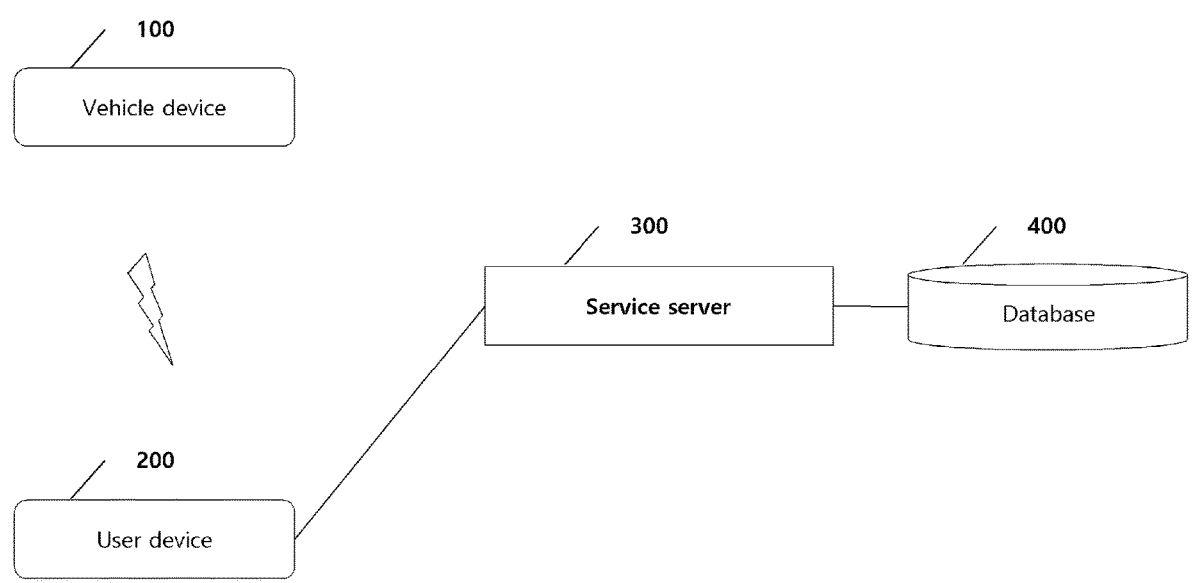
FIG. 4 is a view showing a system for classifying road risk information according to another embodiment of the present invention.

FIG. 4 is a view showing a system for classifying road risk information according to another embodiment of the present invention.

Referring to FIG. 4, a system for classifying road risk information according to another embodiment of the present invention may include a vehicle device 100, a user device 200, a service server 300, and a database 400.

The vehicle device 100 is attached to a vehicle and may acquire various road state information, such as road images, sensing values and the like, from a road on which the vehicle is running. The vehicle device 100 may include a camera for acquiring the road images, and a sensor for acquiring the sensing values. The vehicle device 100 may connect to the user device 200 through wireless communication and provide the user device 200 with various types of acquired information.

The user device 200 may activate a mobile application for detecting road surface defects, wirelessly connect to the vehicle device 100 through the activates mobile application, collect various road state information, learn the collected road state information on the basis of a learning model based on deep learning, classify road risk information on the basis of a result of the learning, and detect road surface defects on the basis of the classified road risk information.

The service server 300 may connect to the user device 200 through wireless communication, provide the user device 200 with a mobile application for detecting road surface defects and at least one predefined learning model, and receive information on detected road surface defects from the user device 200.

The database 400 may store and manage the collected road state information, at least one predefined learning model, and the road risk information classified through the learning model.

Figure 5:
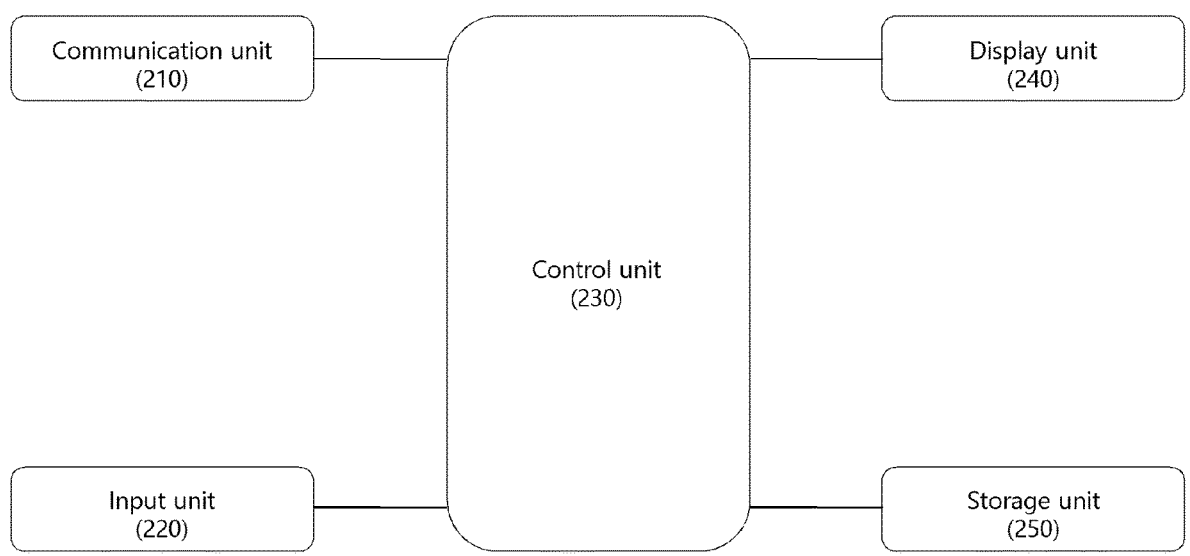
FIG. 5 is a view showing the configuration of the mobile device shown in FIG. 4.

FIG. 5 is a view showing the configuration of the mobile device shown in FIG. 4.

Referring to FIG. 5, a mobile device 200 according to another embodiment of the present invention may include a communication unit 210, an input unit 220, a control unit 230, a display unit 240, and a storage unit 250.

The communication unit 210 may connect to the vehicle device 100 and the service server 300 and transmit and receive various information. For example, the communication unit 210 may connect to the vehicle device 100 and collect various road state information. As another example, the communication unit 210 may connect to the service server 300 to be provided with a mobile application for detecting road surface defects and information on detected load surface defects.

The input unit 220 may receive information from the user according to handling of a menu or a key.

The control unit 230 may extract a Region of Interest (ROI) from a road image among the collected road state information, perform image processing on the extracted ROI, and create a predefined grayscale image on the basis of a result of the image processing.

The control unit 230 may learn the converted predefined grayscale image on the basis of a learning model based on deep learning, and recognize road risk information on the basis of a result of the learning.

The control unit 230 may classify the road risk information, for example, potholes and non-potholes, from the road state information on the basis of a result of the recognition, and detect road surface defects.

The display unit 240 may display various information on the detected road surface defects.

The storage unit 250 may store and manage the collected road state information, at least one predefined learning model, and the road risk information classified through the learning model.

The features, structures, effects and the like described in the above embodiments are included in one embodiment of the present invention, and they are not necessarily limited to one embodiment. Furthermore, the features, structures, effects and the like exemplified in each embodiment may be embodied to be combined with or modified respect to other embodiments by those skilled in the art. Accordingly, contents related to the combination and modification should be interpreted as being included in the scope of the present invention.

Although it has been described focusing on the embodiments, this is only illustrative and not intended to restrict the present invention, and those skilled in the art may make various modifications and applications that have not been described above without departing from the original features of the embodiments. For example, each constitutional component specifically shown in the embodiments may be modified to be embodied. In addition, the differences related to the modifications and applications should be interpreted as being included in the scope of the present invention specified in the appended claims.

The invention claimed is:

1. A system for classifying road risk information, the system comprising:
   an information collection unit for receiving various road state information acquired from a vehicle device;
   an information processing unit for performing image processing on the collected road state information, and converting a result of the image processing into a predefined grayscale image;
   an information learning unit for learning the converted predefined grayscale image on the basis of a predetermined learning model based on deep learning, and recognizing the road risk information on the basis of a result of the learning; and
   an information classification unit for classifying the road risk information from the road state information on the basis of a result of the recognition, and detecting road surface defects on the basis of a result of the classification.

2. The system according to claim 1, wherein the information processing unit extracts a polygonal Region of Interest (ROI) from a road image among the collected road state information, performs image processing on the extracted ROI, and creates a predefined grayscale image on the basis of a result of the image processing.

3. The system according to claim 1, wherein the information learning unit learns the converted predefined grayscale image on the basis of at least two predetermined learning models based on deep learning.

4. The system according to claim 1, further comprising an information transmission unit for transmitting the road surface defects detected by the information classification unit to a user device.

5. A system for classifying road risk information, the system comprising:
   a communication unit for collecting various road state information acquired from a vehicle device;
   a control unit for learning the collected road state information on the basis of a predetermined learning model based on deep learning, classifying the road risk information from the road state information on the basis of a result of the learning, and detecting road surface defects on the basis of a result of the classification; and
   a storage unit for storing the collected road state information, the predetermined learning model, and the classified road risk information.

6. The system according to claim 5, wherein the control unit activates a mobile application, performs image processing on the collected road state information through the activated mobile application, converts a result of the image processing into a predefined grayscale image, and learns the converted predefined grayscale image on the basis of a predetermined learning model based on deep learning.

7. The system according to claim 6, wherein the control unit extracts a Region of Interest from a road image among the collected road state information, performs image processing on the extracted ROI, and creates a predefined grayscale image on the basis of a result of the image processing.

8. The system according to claim 5, wherein the control unit recognizes the road risk information on the basis of a result of the learning, classifies the road risk information from the road state information on the basis of a result of the recognition, and detects road surface defects on the basis of a result of the classification.

9. A method of classifying road risk information, the method comprising:
   an information collection step of receiving various road state information acquired from a vehicle device;
   an information processing step of performing image processing on the collected road state information, and converting a result of the image processing into a predefined grayscale image;
   an information learning step of learning the converted predefined grayscale image on the basis of a predetermined learning model based on deep learning, and recognizing the road risk information on the basis of a result of the learning; and
   an information classification step of classifying the road risk information from the road state information on the basis of a result of the recognition, and detecting road surface defects on the basis of a result of the classification.

10. The method according to claim 9, wherein the information processing step extracts a Region of Interest (ROI) from a road image among the collected road state information, performs image processing on the extracted ROI, and creates a predefined grayscale image on the basis of a result of the image processing.

* * * * *